United States Patent

Yoshimoto et al.

Patent Number: 5,169,814
Date of Patent: Dec. 8, 1992

[54] CATALYSTS FOR DENITRIZATION

[75] Inventors: Masafumi Yoshimoto; Tadao Nakatsuji; Kazuhiko Nagano, all of Osaka, Japan

[73] Assignee: Sakai Chemical Industry Co., Ltd., Osaka, Japan

[21] Appl. No.: 417,423

[22] Filed: Oct. 5, 1989

[30] Foreign Application Priority Data

Oct. 7, 1988 [JP] Japan .................. 63-254251
Oct. 8, 1988 [JP] Japan .................. 63-254492

[51] Int. Cl.$^5$ .............................. B01J 29/06
[52] U.S. Cl. ............................ 502/74; 502/60
[58] Field of Search ............ 423/239, 239 A; 502/60, 502/74

[56] References Cited

U.S. PATENT DOCUMENTS

| | | | |
|---|---|---|---|
| 3,476,508 | 11/1969 | Kearby et al. | 423/239 |
| 4,002,723 | 1/1977 | Inaba et al. | 423/239 A |
| 4,052,337 | 10/1977 | Nishikawa et al. | 423/239 A |
| 4,735,930 | 4/1988 | Gerdes et al. | 423/239 A |

Primary Examiner—Carl F. Dees
Attorney, Agent, or Firm—Wenderoth, Lind & Ponack

[57] ABSTRACT

A denitrizing catalyst with comprises:
(a) a zeolite represented by the general formula (I)

$$H_A M_B[(AlO_2)_x \cdot (SiO_2)_Y] \cdot ZH_2O$$

wherein M is an alkali metal or an alkaline earth metal, and $A+nB=X$ wherein n is a valency of the metal M, in amounts of 80–99.9% by weight; and
(b) at least one metal or at least one oxide of metals selected from the group consisting of Ru, Rh, Pd, Ag, Pt, Au, Co, Cu, Cr and Ni, in amounts of 0.1–20% by weight.

A further denitrizing catalyst which comprises a zeolite represented by the general formula $$H_A(M^1)_B(M^2)_C[(AlO_2)_x \cdot (SiO_2)_Y] \cdot ZH_2O$$

wherein $M^1$ is an alkali metal or an alkaline earth metal, $M^2$ is a metal selected from the group consisting of Ru, Rh, Pd, Ag, Pt, Au, Co, Cu, Cr and Ni, $A+n_1B+n_2C=X$ wherein $n_1$ and $n_2$ are valecies of the metals $M^1$ and $M^2$, respectively.

Waste gases containing nitrogen oxides therein are denitrized by putting the gases into contact with the catalysts in the absence of reducing agents.

2 Claims, No Drawings

CATALYSTS FOR DENITRIZATION

This invention relates to a catalyst and a method for denitrization of nitrogen oxides contained in waste gases.

There are already known a variety of methods for denitrizing nitrogen oxides contained in waste gases, among which are exemplarily a method wherein nitrogen oxides are oxidized and absorbed in alkali solutions and a further method wherein nitrogen oxides are reduced to nitrogen using ammonia as a reducing agent in the presence of catalysts. However, the former method needs treatment of the resultant waste water, hence the method is costly, while the latter method has a disadvantage that ammonia reacts with sulfur oxides which are usually contained in waste gases together with nitrogen oxides to form ammonium salts such as ammonium sulfate which deposits on the catalysts and hence decreases denitrizing activity of the catalysts during the denitrizing operations.

A further method is also known in which nitrogen oxide is reduced to nitrogen using carbon monoxide as a reducing agent in the presence of catalysts. In this method no salt is formed during denitrizing operations, but when waste gases contain oxygen therein as usually the case, the reduction of nitrogen oxides is not carried out effectively on account of the reaction of carbon monoxide with oxygen as side reactions.

Therefore, catalysts have also been proposed which decompose directly nitrogen oxides in the absence of a reducing agent, however, such catalysts have hitherto been found very low in denitrizing activity.

It is, therefore, an object of the invention to provide a novel denitrizing catalyst which effectively decomposes nitrogen oxides in the absence of a reducing agent.

It is a further object of the invention to provide a method of effectively decomposing nitrogen oxides using such a catalyst in the absence of a reducing agent.

In accordance with the invention, there is provided a first denitrizing catalyst which comprises:

(a) a zeolite represented by the general formula (I)

$$H_A M_B[(AlO_2)_X \cdot (SiO_2)_Y] \cdot zH_2O$$

wherein M is an alkali metal or an alkaline earth metal, and $A + nB = X$ wherein n is a valency of the metal M, in amounts of 80-99.9% by weight; and (b) at least one metal or at least one oxide of metals selected from the group consisting of Ru, Rh, Pd, Ag, Pt, Au, Co, Cu, Cr and Ni, in amounts of 0.1-20% by weight.

The first catalyst of the invention may be produced by known methods using commercially available zeolites represented by the general formula (Ia)

$$M_B[(AlO_2)_X \cdot (SiO_2)_Y] \cdot zH_2O$$

wherein M is an alkali metal or an alkaline earth metal, preferably sodium, potassium, calcium, magnesium, barium or strontium, and $nB = X$ wherein n is a valence of the metal M.

There may be mentioned as such commercially available zeolites, for example, NX-100P, CA-100P, NA-100P, KA-100P, GA-100P or NM-100P, all of which are available from Nippon Kagaku Kogyo K.K.

The zeolite represented by the general formula (I) may be obtained by partly substituting M in the zeolite (Ia) with $NH_4$, and then drying and calcining the resultant $NH_4$-substituted zeolite at temperatures of 300°-700° C. More specifically, a commercially available zeolite (Ia) is immersed in an aqueous solution of ammonium chloride, stirred at room temperatures or elevated temperatures, and collected by filtration. If necessary, the operations are repeated until the desired degree of substitution of the metal M with $NH_4$ is completed. The thus prepared $NH_4$-substituted zeolite is then calcined to provide the beforementioned zeolite having the general formula (I).

It is preferred that the zeolite (I) has values of A, B and X so that they satisfy: $A/X > 0.1$ and $nB/X > 0.1$.

The first catalyst of the invention contains the zeolite having the general formula (I) in amounts of 80-99.9% by weight and at least one metal or at least one oxide of metals selected from the group (b) in amounts of 0.1-20% by weight, based on the catalyst, respectively.

Any method may be employed to produce the catalyst of the invention. For example, a honeycomb structure is immersed in an aqueous slurry of the zeolite, dried and calcined. Then the honeyomb structure is immersed in an aqueous solution of water soluble compounds of the same metals as the oxides of the group (b), dried and calcined, to provide the catalyst of the invention in the form of honeycomb supporting the zeolite and at least one metal or oxide of the metals of the group (b). Alternatively, water soluble compounds of the same metals of the oxides of the group (b) are dissolved in the slurry of the zeolite, and a honeycomb structure is immersed in the slurry, dried and calcined.

When necessary, molding assistants, reinforcements, inorganic fibers or organic binders may be used in the production of the catalysts.

It is postulated based on the inventor's investigation that the elementary reactions of the denitrization of nitrogen oxides are as follows:

$$2NO + 2e^- \rightarrow 2NO^- \tag{1}$$

$$2NO^- \rightarrow N_2 + 2O^- \tag{2}$$

$$2O^- \rightarrow O_2 + 2e^- \tag{3}$$

$$O_2 \rightarrow O_2 \uparrow \tag{4}$$

It is likely that alkali metals or alkaline earth metals in the zeolite participate in the reactions (1) and (2), hydrogen in the zeolite in the reaction (3) and the metals or their oxides of the group (b) in the reaction of (4). It is not yet clear to what extent the individual elementary reactions contribute to over-all reaction velocity, but it has been found that the combination of the ingredients in the above ratios provides the catalyst with high denitrizing activity.

In accordance with the invention, there is provided a second denitrizing catalyst which comprises a zeolite represented by the general formula (II)

$$H_A(M^1)_B(M^2)_C[(AlO_2)_X \cdot (SiO_2)_Y] \cdot zH_2O$$

wherein $M^1$ is an alkali metal or an alkaline earth metal, preferably sodium, potassium, calcium, magnesium, barium or strontium, $M^2$ is a metal selected from the group consisting of Ru, Rh, Pd, Ag, Pt, Au, Co, Cu, Cr and Ni, and $A + n_1B + n_2C = X$ wherein $n_1$ and $n_2$ are valecies of the metals $M^1$ and $M^2$, respectively.

The second catalyst of the invention may also be produced by known methods using commercially available zeolites represented by the general formula (IIa)

$$M^1{}_B[(AlO_2)_x \cdot (SiO_2)_y] \cdot zH_2O$$

wherein $M^1$ is an alkali metal or an alkaline earth metal, and $n_1B=X$ wherein $n_1$ is a valence of the metal $M^1$. There may be mentioned as such commercially available zeolites, for example, NX-100P, CX-100P, CA-100P, NA-100P, KA-100P, GA-100P or NM-100P, all of which are available from Nippon Kagaku Kogyo K.K. In place of the above starting zeolites, a zeolite having the general formula (IIb)

$$(M^1{}_B)(M^2{}_C)[(AlO_2)_x \cdot (SiO_2)_y] \cdot zH_2O$$

wherein $M^1$ is an alkali metal or an alkaline earth metal, $M^2$ is at least one metal selected from the group consisting of Ru, Rh, Pd, Ag, Pt, Au, Co, Cu, Cr and Ni, and $A+n_1B+n_2C=X$ wherein $n_1$ and $n_2$ are valencies of the metal $M^1$ and $M^2$, respectively, may also be used, which is available as, for example, UA-100P by Nippon Kagaku Kogyo K.K.

The second catalyst of the invention may be produced using the zeolite (IIa), for example, NX-100P (zeolite-X) wherein $M^1$ is Na, in a manner below. At first, the metal $M^1$ in the zeolite is partly substituted with the metal $M^2$ by immersing the zeolite in a solution of salts of the metal $M^2$, preferably chlorides, at room temperatures or elevated temperatures, and then collecting by filtration. If necessary, the immersion in the solution is repeated until desired degree of substitution of $M^1$ with $M^2$ is completed, to provide metal substituted zeolites.

Then, the metal substituted zeolite is immersed in an aqueous solution of ammonium chloride at room temperatures or elevated temperatures to substitute the metal $M^1$ with $NH_4$, and then collecting by filtration. If necessary, the immersion in the ammonium chloride solution is repeated until desired degree of substitution of $M^1$ with $NH_4$ is completed, to provide metal and $NH_4$-substituted zeolites. The zeolite (II) is obtained by calcining the metal and $NH_4$-substituted zeolites at temperatures of 300°-700° C.

When UA-100P (zeolite-A) wherein $M^1$ is Na and $M^2$ is Cu, for instance, is used as a starting zeolite (IIb), the metal $M^1$ therein is substituted to a desired degree with $NH_4$ in the same manner as hereinbefore described, and the resultant $NH_4$-substituted zeolites are then calcined at temperatures of 300°-700° C., to provide the zeolite (II).

It is preferred that the zeolite having the general formula (II) has values of A, B, C and X so that they satisfy: $A/X>0.1$, $n_1B/X>0.1$ and $n_2C/X>0.05$.

Also with regard to the second catalyst, it is likely that alkali metals or alkaline earth metals in the zeolite participate in the aforesaid elementary reactions (1) and (2), hydrogen in the zeolite in the reaction (3) and the metals or their oxides of the metals selected from the group consisting of Ru, Rh, Pd, Ag, Pt, Au, Co, Cu, Cr and Ni, in the reaction of (4). It is not yet clear to what extent the individual elementary reactions contribute to over-all reaction velocity, but it has been found that the combination of the ingredients in the above ratios provides the catalyst with high denitrizing activity.

To carry out denitrization of nitrogen oxides contained in waste gases, the gases are put into contact with the catalyst at temperatures of 300°-800° C., preferably at temperatures of 400°-600° C. in a space velocity of 500-50000 $hr^{-1}$ in the absence of a reducing agent.

The invention will now be described with reference to examples, however, the invention is not limited thereto.

I. Preparation of Catalysts Containing $H_4M_B[(AlO_2)_x \cdot (SiO_2)_y] \cdot zH_2O$ and Denitrization Example 1

An amount of 500 g of CX-100P (zeolite-X) represented by $M[(AlO_2)_x \cdot (SiO_2)_y] \cdot zH_2O$ wherein M is Ca is stirred in 5 liters of 1N aqueous ammnoum chloride solution at room temperatures over two hours and then collected by filtration. These operations were repeated. The resultant cakes were dried at 100° C. for eight hours, calcined at 300° C. for three hours, and powdered with a sample mill, to provide a zeolite having the formula $H_4M_B[(AlO_2)_x \cdot (SiO_2)_y] \cdot H_2O$ wherein M is Ca, n is 2, $A+2B=X$, $A/X$ is 0.5 and $2B/X$ is 0.5.

A substrate of ceramic fibers was immersed in an aqueous slurry (500 g/l), taken out of the slurry, and excess slurry was removed therefrom and calcined at 600° C. over three hours, to carry the zeolite on the substrate in amounts of two times in weight as much as the substrate.

The substrate was then immersed in an aqueous solution of cupric chloride to support cupric chloride on the substrate in amounts of 5% as Cu by weight based on the total of the zeolite and Cu. The substrate thus having the zeolite and Cu supported thereon was air dried at room temperatures over 12 hours and then calcined at 600° C. for three hours, to provide a catalyst.

Example 2

Ruthenium chloride was used in place of cupric chloride to support ruthenium chloride on the substrate in amounts of 5% as Ru by weight based on the total of the zeolite and Ru, and otherwise in the same manner as in the Example 1, a catalyst was prepared.

Example 3

Rhodium chloride was used in place of cupric chloride to support rhodium chloride on the substrate in amounts of 5% as Rh by weight based on the total of the zeolite and Rh, and otherwise in the same manner as in the Example 1, a catalyst was prepared.

Example 4

Palladium chloride was used in place of cupric chloride to support palladium chloride on the substrate in amounts of 5% as Pd by weight based on the total of the zeolite and Pd, and otherwise in the same manner as in the Example 1, a catalyst was prepared.

Example 5

Silver nitrate was used in place of cupric chloride to support silver nitrate on the substrate in amounts of 5% as Ag by weight based on the total of the zeolite and Ag, and otherwise in the same manner as in the Example 1, a catalyst was prepared.

Example 6

Chloroauric acid was used in place of cupric chloride to support chloroauric acid on the substrate in amounts of 5% as Au by weight based on the total of the zeolite and Au, and otherwise in the same manner as in the Example 1, a catalyst was prepared.

Example 7

Cobalt chloride was used in place of cupric chloride to support cobalt chloride on the substrate in amounts of 5% as Co by weight based on the total of the zeolite and Co, and otherwise in the same manner as in the Example 1, a catalyst was prepared.

Example 8

Chromium cloride was used in place of cupric chloride to support chromium chloride on the substrate in amounts of 5% as Cr by weight based on the total of the zeolite and Cr, and otherwise in the same manner as in the Example 1, a catalyst was prepared.

Example 9

Nickel cloride was used in place of cupric chloride to support nickel chloride on the substrate in amounts of 5% as Ni by weight based on the total of the zeolite and Ni, and otherwise in the same manner as in the Example 1, a catalyst was prepared.

Example 10

In the same manner as in the Example 1, a zeolite catalyst having the formula $H_AM_B[(AlO_2)_X \cdot (SiO_2)_Y] \cdot zH_2O$ wherein M is Ca, n is 2, $A+2B=X$, $A/X$ is 0.1 and $2B/X$ is 0.9 was prepared.

Using the zeolite, a catalyst was prepared in the same manner as in the Example 1.

Example 11

In the same manner as in the Example 1, a zeolite catalyst having the formula $H_AM_B[(AlO_2)_X \cdot (SiO_2)_Y] \cdot zH_2O$ wherein M is Ca, n is 2, $A+2B=X$, $A/X$ is 0.9 and $2B/X$ is 0.1 was prepared.

Using the zeolite, a catalyst was prepared in the same manner as in the Example 1.

Example 12

Cupric cloride was supported on the substrate in amounts of 1% as Cu by weight based on the total of the zeolite and Cu, and otherwise in the same manner as in the Example 1, a catalyst was prepared.

Example 13

Cupric cloride was supported on the substrate in amounts of 20% as Cu by weight based on the total of the zeolite and Cu, and otherwise in the same manner as in the Example 1, a catalyst was prepared.

Example 14

CA-100P (zeolite-A) was used in place of CX-100P, and otherwise in the same manner as in the Example 1, a catalyst was prepared.

Example 15

In place of CX-100P in the Example 1, NX-100P (zeolite-X) represented by the formula $M_B[(AlO_2)_X \cdot (SiO_2)_Y] \cdot zH_2O$ wherein M is Na, was used, and otherwise in the same manner as in the Example 1, a zeolite having the formula $H_AM_B[(AlO_2)_X \cdot (SiO_2)_Y] \cdot zH_2O$ wherein M is Na, n is 1, $A+B=X$, $A/X$ is 0.5 and $B/X$ is 0.5, was prepared.

Using the zeolite, a catalyst was prepared in the same manner as in the Example 1.

Example 16

NA-100P (zeolite-A) was used in place of NX-100P, and otherwise in the same manner as in the Example 15, a catalyst was prepared.

Example 17

NM-100P (mordenite) was used in place of NX-100P, and otherwise in the same manner as in the Example 15, a catalyst was prepared.

Example 18

In place of CX-100P in the Example 1, KA-100P (zeolite-A) represented by the formula $M_B[(AlO_2)_X \cdot (SiO_2)_Y] \cdot zH_2O$ wherein M is K, was used, and otherwise in the same manner as in the Example 1, a zeolite having the formula $H_AM_B[(AlO_2)_X \cdot (SiO_2)_Y] \cdot zH_2O$ wherein M is K, n is 1, $A+B=X$, $A/X$ is 0.5 and $B/X$ is 0.5, was prepared.

Using the zeolite, a catalyst was prepared in the same manner as in the Example 1.

Example 19

In place of CX-100P in the Example 1, GA-100P (zeolite-A) represented by the formula $M_B[(AlO_2)_X \cdot (SiO_2)_Y] \cdot zH_2O$ wherein M is Mg, was used, and otherwise in the same manner as in the Example 1, a zeolite having the formula $H_AM_B[(AlO_2)_X \cdot (SiO_2)_Y] \cdot zH_2O$ wherein M is Mg, n is 2, $A+2B=X$, $A/X$ is 0.5 and $2B/X$ is 0.5, was prepared.

Using the zeolite, a catalyst was prepared in the same manner as in the Example 1.

Example 20

The zeolite prepared in the Example 15 was further treated with an ½N aqueous solution of strontium chloride to substitute all the sodium atoms in the zeolite with Sr, to provide a zeolite having the formula $H_AM_B[(AlO_2)_X \cdot (SiO_2)_Y] \cdot zH_2O$ wherein M is Sr, n is 2, $A+2B=X$, $A/X$ is 0.5 and $2B/X$ is 0.5.

Using the zeolite, a catalyst was prepared in the same manner as in the Example 15.

Example 21

The zeolite prepared in the Example 15 was further treated with an ½N aqueous solution of barium chloride to substitute all the sodium atoms in the zeolite with Ba, to provide a zeolite having the formula $H_AM_B[(AlO_2)_X \cdot (SiO_2)_Y] \cdot zH_2O$ wherein M is Ba, n is 2, $A+2B=X$, $A/X$ is 0.5 and $2B/X$ is 0.5.

Using the zeolite, a catalyst was prepared in the same manner as in the Example 15.

Comparative Example 1

The zeolite prepared in the Example 15 was further treated with an ½N aqueous solution of zinc chloride to substitute all the sodium atoms in the zeolite with Zn, to provide a zeolite having the formula $H_AM_B[(AlO_2)_X \cdot (SiO_2)_Y] \cdot zH_2O$ wherein M is Zn, n is 2, $A+2B=X$, $A/X$ is 0.5 and $2B/X$ is 0.5.

Using the zeolite, a catalyst was prepared in the same manner as in the Example 15.

Comparative Example 2

The zeolite prepared in the Example 15 was further treated with an ½N aqueous solution of cerium chloride to substitute all the sodium atoms in the zeolite with Ce, to provide a zeolite having the formula $H_AM_B[(AlO_2)_X$ .(SiO$_2$)$_y$].zH$_2$O wherein M is Ce, n is 3, A+3B=X, A/X is 0.5 and 3B/X is 0.5.

Using the zeolite, a catalyst was prepared in the same manner as in the Example 15.

Comparative Example 3

The zeolite prepared in the Example 15 was further treated with an ½N aqueous solution of indium chloride to substitute all the sodium atoms in the zeolite with In, to provide a zeolite having the formula H$_A$M$_B$[(AlO$_2$)$_x$.(SiO$_2$)$_y$].zH$_2$O wherein M is In, n is 3, A+3B=X, A/X is 0.5 and 3B/X is 0.5.

Using the zeolite, a catalyst was prepared in the same manner as in the Example 15.

Reference Example 1

An amount of 500 g of a zeolite (ZSM-5 by Mobile Oil) was immersed in a 0.1N aqueous solution of cupric chloride in a three necked flask provided with a condenser, and the solution was heated at 90°-100° C. over 5 hours. The zeolite was collected by filtration, and then subjected to the same operations as above, to provide a zeolite in which Na was substituted with Cu in amounts of 10.0% by weight.

Thereafter, without treating the zeolite with an aqueous solution of ammonium chloride, a catalyst was prepared in the same manner as in the Example 1.

Denitrization

A gas composed of 200 ppm of NO, 2% of O$_2$, 10% of H$_2$O and the balance N$_2$ was passed through the catalysts in a space velocity of 1000 hr$^{-1}$ at 300° C., 400° C. and 500° C., respectively. The conversion rates of NO to N$_2$ are shown in the Table 1.

TABLE 1

| | Type of Starting Zeolite | Zeolite | | Metal in Zeolite | Catalyst Group (b) Metal |
|---|---|---|---|---|---|
| | | A/X | nB/X | | |
| Example | | | | | |
| 1 | X | 0.5 | 0.5 | Ca | Cu |
| 2 | X | 0.5 | 0.5 | Ca | Ru |
| 3 | X | 0.5 | 0.5 | Ca | Rh |
| 4 | X | 0.5 | 0.5 | Ca | Pd |
| 5 | X | 0.5 | 0.5 | Ca | Ag |
| 6 | X | 0.5 | 0.5 | Ca | Au |
| 7 | X | 0.5 | 0.5 | Ca | Co |
| 8 | X | 0.5 | 0.5 | Ca | Cr |
| 9 | X | 0.5 | 0.5 | Ca | Ni |
| 10 | X | 0.1 | 0.9 | Ca | Cu |
| 11 | X | 0.9 | 0.1 | Ca | Cu |
| 12 | X | 0.5 | 0.5 | Ca | Cu |
| 13 | X | 0.5 | 0.5 | Ca | Cu |
| 14 | A | 0.5 | 0.5 | Ca | Cu |
| 15 | X | 0.5 | 0.5 | Na | Cu |
| 16 | A | 0.5 | 0.5 | Na | Cu |
| 17 | M*) | 0.5 | 0.5 | Na | Cu |
| 18 | A | 0.5 | 0.5 | K | Cu |
| 19 | A | 0.5 | 0.5 | Mg | Cu |
| 20 | X | 0.5 | 0.5 | Sr | Cu |
| 21 | X | 0.5 | 0.5 | Ba | Cu |
| Compara. | | | | | |
| 1 | X | 0.5 | 0.5 | Zn | Cu |
| 2 | X | 0.5 | 0.5 | Ce | Cu |
| 3 | X | 0.5 | 0.5 | In | Cu |
| Ref. 1 | | | | | |

| | Catalyst Content of Metal (%)*) | Denitrizing Rate (%) Reaction Temperature (°C.) | | |
|---|---|---|---|---|
| | | 300 | 400 | 500 |
| Example | | | | |
| 1 | 5 | 80.6 | 94.2 | 96.5 |
| 2 | 5 | 59.8 | 73.1 | 80.5 |
| 3 | 5 | 52.6 | 75.3 | 83.1 |

TABLE 1-continued

| 4 | 5 | 39.8 | 63.2 | 76.2 |
|---|---|---|---|---|
| 5 | 5 | 86.3 | 95.3 | 97.1 |
| 6 | 5 | 89.9 | 97.2 | 98.8 |
| 7 | 5 | 73.1 | 87.3 | 79.9 |
| 8 | 5 | 59.6 | 78.6 | 84.1 |
| 9 | 5 | 45.6 | 68.8 | 74.2 |
| 10 | 5 | 72.6 | 81.6 | 88.6 |
| 11 | 5 | 69.9 | 82.2 | 86.2 |
| 12 | 1 | 78.1 | 88.6 | 92.2 |
| 13 | 20 | 82.2 | 96.1 | 97.2 |
| 14 | 5 | 81.6 | 94.3 | 95.5 |
| 15 | 5 | 59.8 | 76.5 | 84.2 |
| 16 | 5 | 56.2 | 71.1 | 80.5 |
| 17 | 5 | 77.6 | 93.8 | 95.9 |
| 18 | 5 | 53.2 | 73.6 | 81.1 |
| 19 | 5 | 80.1 | 93.2 | 95.5 |
| 20 | 5 | 78.2 | 89.9 | 96.1 |
| 21 | 5 | 79.1 | 88.2 | 95.6 |
| Compara. | | | | |
| 1 | 5 | 30.1 | 38.2 | 45.6 |
| 2 | 5 | 26.5 | 33.1 | 42.3 |
| 3 | 5 | 28.6 | 36.9 | 48.4 |
| Ref. 1 | | 37.2 | 46.7 | 56.6 |

Notes:
*)Mordenite
*)Content of Group (b) metal, % as metals.

II. PREPARATION OF ZEOLITES, H$_A$(M$^1$)$_B$(M$^2$)$_C$[(AlO$_2$)$_X$.(SiO$_2$)$_Y$].zH$_2$O, and Denitrization

Example 1

An amount of 500 g of CX-100P (zeolite-X) represented by (M$^1$)$_B$[(AlO$_2$)$_X$.(SiO$_2$)$_Y$].zH$_2$O wherein M$^1$ is Ca is stirred in 5 liters of ½N aqueous ammnoum chloride solution in a three necked flask provided with a condenser at 90°-100° C. for five hours, and then collected by filtration. These operations were repeated. The resultant cakes were dried at 100° C. for eight hours, calcined at 300° C. for three hours, and powdered with a sample mill, to provide a zeolite having the formula H$_A$(M$^1$)$_B$(M$^2$)$_C$[(AlO$_2$)$_X$.(SiO$_2$)$_Y$].zH$_2$O wherein M$^1$ is Ca, M$^2$ is Cu, n$_1$ is 2, n$_2$ is 2, A+2B+2C=X, A/X is 0.40, 2B/X is 0.40 and 2C/X is 0.20.

A substrate of ceramic fibers was immersed in an aqueous slurry (500 g/l) of the zeolite, taken out of the slurry, and excess slurry was removed therefrom and calcined at 600° C. over three hours, to carry the zeolite on the substrate in amounts of two times in weight as much as the substrate, to provide a catalyst.

Example 2

A zeolite having the same formula as in the Example 1 wherein A/X is 0.10, 2B/X is 0.70 and 2C/X is 0.20 was prepared in the same manner as in the Example 1.

Using the zeolite, a catalyst was prepared in the same manner as in the Example 1.

Example 3

A zeolite having the same formula as in the Example 1 wherein A/X is 0.70, 2B/X is 0.10 and 2C/X is 0.20 was prepared in the same manner as in the Example 1.

Using the zeolite, a catalyst was prepared in the same manner as in the Example 1.

Example 4

A zeolite having the same formula as in the Example 1 wherein A/X is 0.40, 2B/X is 0.50 and 2C/X is 0.10 was prepared in the same manner as in the Example 1.

Using the zeolite, a catalyst was prepared in the same manner as in the Example 1.

Example 5

A ½N aqueous solution of ruthenium chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Ru, $n_1$ is 2, $n_2$ is 3, $A+2B+3C=X$, $A/X$ is 0.40, $2B/X$ is 0.40 and $3C/X$ is 0.20, was prepared.

Using the zeolite, a catalyst was prepared in the same manner as in the Example 1.

Example 6

A ½N aqueous solution of rhodium chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Rh, $n_1$ is 2, $n_2$ is 3, $A+2B+3C=X$, $A/X$ is 0.40, $2B/X$ is 0.40 and $3C/X$ is 0.20, was prepared.

Using the zeolite, a catalyst was prepared in the same manner as in the Example 1.

Example 7

A ½N aqueous solution of palladium chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Pd, $n_1$ is 2, $n_2$ is 2, $A+2B+2C=X$, $A/X$ is 0.40, $2B/X$ is 0.40 and $2C/X$ is 0.20, was prepared.

Using the zeolite, a catalyst was prepared in the same manner as in the Example 1.

Example 8

A ½N aqueous solution of silver nitrate was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Ag, $n_1$ is 2, $n_2$ is 1, $A+2B+C=X$, $A/X$ is 0.45, $2B/X$ is 0.45 and $C/X$ is 0.10, was prepared.

Using the zeolite, a catalyst was prepared in the same manner as in the Example 1.

Example 9

A ½N aqueous solution of platinum tetrachloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Pt, $n_1$ is 2, $n_2$ is 4, $A+2B+4C=X$, $A/X$ is 0.40, $2B/X$ is 0.40 and $4C/X$ is 0.20, was prepared.

Using the zeolite, a catalyst was prepared in the same manner as in the Example 1.

Example 10

A ½N aqueous solution of auric trichloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Au, $n_1$ is 2, $n_2$ is 3, $A+2B+3C=X$, $A/X$ is 0.40, $2B/X$ is 0.40 and $3C/X$ is 0.20, was prepared.

Using the zeolite, a catalyst was prepared in the same manner as in the Example 1.

Example 11

A ½N aqueous solution of cobalt chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Co, $n_1$ is 2, $n_2$ is 2, $A+2B+2C=X$, $A/X$ is 0.40, $2B/X$ is 0.40 and $2C/X$ is 0.20, was prepared.

Using the zeolite, a catalyst was prepared in the same manner as in the Example 1.

Example 12

A ½N aqueous solution of chromous chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Cr, $n_1$ is 2, $n_2$ is 2, $A+2B+2C=X$, $A/X$ is 0.40, $2B/X$ is 0.40 and $2C/X$ is 0.20, was prepared.

Using the zeolite, a catalyst was prepared in the same manner as in the Example 1.

Example 13

A ½N aqueous solution of nickel chloride was used in place of cupric chloride solution, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Ca, $M^2$ is Ni, $n_1$ is 2, $n_2$ is 2, $A+2B+2C=X$, $A/X$ is 0.40, $2B/X$ is 0.40 and $2C/X$ is 0.20, was prepared.

Using the zeolite, a catalyst was prepared in the same manner as in the Example 1.

Example 14

CA-100P (zeolite-A) was used in place of CX-100P, and otherwise in the same manner as in the Example 1, a catalyst was prepared.

Example 15

In place of CX-100P in the Example 1, NX-100P (zeolite-X) having the formula $(M^1)_B[(AlO_2)_X \cdot (SiO_2)_Y] \cdot zH_2O$ wherein $M^1$ is Na was used, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is Na, $M^2$ is Cu, $n_1$ is 1, $n_2$ is 2, $A+B+2C=X$, $A/X$ is 0.40, $B/X$ is 0.40 and $2C/X$ is 0.20, was prepared.

Using the zeolite, a catalyst was prepared in the same manner as in the Example 1.

Example 16

NA-100P (zeolite-A) was used in place of NX-100P, and otherwise in the same manner as in the Example 15, a catalyst was prepared.

Example 17

NM-100P (mordenite) was used in place of NX-100P, and otherwise in the same manner as in the Example 15, a catalyst was prepared.

Example 18

In place of CX-100P in the Example 1, KA-100P (zeolite-A) having the formula $(M^1)_B[(AlO_2)_X \cdot (SiO_2)_Y] \cdot zH_2O$ wherein $M^1$ is K was used, and otherwise in the same manner as in the Example 1, a zeolite having the formula $H_A(M^1)_B(M^2)_C[(AlO_2)_X \cdot (SiO_2)_Y] \cdot zH_2O$ wherein $M^1$ is K, $M^2$ is Cu, $n_1$ is 1, $n_2$ is 2, A+B+2C=X, A/X is 0.40, B/X is 0.40 and 2C/X is 0.20, was prepared.

Using the zeolite, a catalyst was prepared in the same manner as in the Example 1.

Example 19

In place of CX-100P in the Example 1, GA-100P (zeolite-A) having the formula $(M^1)_B[(AlO_2)_X \cdot (SiO_2)_y] \cdot zH_2O$ wherein $M^1$ is Mg was used, and otherwise in the same manner as in the Example 1, a zeolite having the formula $H_A(M^1)_B(M^2)_C[(AlO_2)_X \cdot (SiO_2)_y] \cdot zH_2O$ wherein $M^1$ is Mg, $M^2$ is Cu, $n_1$ is 2, $n_2$ is 2, A+2B+2C=X, A/X is 0.40, 2B/X is 0.40 and 2C/X is 0.20, was prepared.

Using the zeolite, a catalyst was prepared in the same manner as in the Example 1.

Example 20

The zeolite prepared in the Example 15 was further treated with an $\frac{1}{2}$N aqueous solution of strontium chloride to substitute all the sodium atoms in the zeolite with Sr, to provide a zeolite having the formula $H_A(M^1)_B(M^2)_C[(AlO_2)_X \cdot (SiO_2)_y] \cdot zH_2O$ wherein $M^1$ is Sr, $M^2$ is Cu, $n_1$ is 2, $n_2$ is 2, A+2B+2C=X, A/X is 0.40, 2B/X is 0.40 and 2C/X is 0.20.

Using the zeolite, a catalyst was prepared in the same manner as in the Example 1.

Example 21

The zeolite prepared in the Example 15 was further treated with an $\frac{1}{2}$N aqueous solution of barium chloride to substitute all the sodium atoms in the zeolite with Ba, to provide a zeolite having the formula $H_A(M^1)_B(M^2)_C[(AlO_2)_X \cdot (SiO_2)_y] \cdot zH_2O$ wherein $M^1$ is Ba, $M^2$ is Cu, $n_1$ is 2, $n_2$ is 2, A+2B+2C=X, A/X is 0.40, 2B/X is 0.40 and 2C/X is 0.20.

Using the zeolite, a catalyst was prepared in the same manner as in the Example 1.

Example 22

In place of CX-100P in the Example 1, UA-100P (zeolite-A) having the formula $(M^1)_B[(AlO_2)_X \cdot (SiO_2)_y] \cdot zH_2O$ wherein $M^1$ is Na and $M^2$ is Cu was used, and the treatment with cupric chloride was omitted, and otherwise in the same manner as in the Example 1, a zeolite having the formula $H_A(M^1)_B(M^2)_C[(AlO_2)_X \cdot (SiO_2)_y] \cdot zH_2O$ wherein $M^1$ is Na, $M^2$ is Cu, $n_1$ is 1, $n_2$ is 2, A+B+2C=X, A/X is 0.30, B/X is 0.33 and 2C/X is 0.47, was prepared.

Using the zeolite, a catalyst was prepared in the same manner as in the Example 1.

Comparative Example 1

The zeolite prepared in the Example 15 was further treated with an $\frac{1}{2}$N aqueous solution of zinc chloride to substitute all the sodium atoms in the zeolite with Zn, to provide a zeolite having the formula $H_A(M^1)_B(M^2)_C[(AlO_2)_X \cdot (SiO_2)_y] \cdot zH_2O$ wherein $M^1$ is Zn, $M^2$ is Cu, $n_1$ is 2, $n_2$ is 2, A+2B+2C=X, A/X is 0.40, 2B/X is 0.40 and 2C/X is 0.20.

Using the zeolite, a catalyst was prepared in the same manner as in the Example 15.

Comparative Example 2

A $\frac{1}{2}$N aqueous solution of cerium chloride was used in place of cupric chloride solution, and otherwise in the same manner as in the Example 1, a zeolite having the formula $H_A(M^1)_B(M^2)_C[(AlO_2)_X \cdot (SiO_2)_y] \cdot zH_2O$ wherein $M^1$ is Ca, $M^2$ is Ce, $n_1$ is 2, $n_2$ is 3, A+2B+3C=X, A/X is 0.40, 2B/X is 0.40 and 3C/X is 0.20, was prepared.

Using the zeolite, a catalyst was prepared in the same manner as in the Example 1.

Comparative Example 3

A $\frac{1}{2}$N aqueous solution of indium chloride was used in place of cupric chloride solution, and otherwise in the same manner as in the Example 1, a zeolite having the formula $H_A(M^1)_B(M^2)_C[(AlO_2)_X \cdot (SiO_2)_y] \cdot zH_2O$ wherein $M^1$ is Ca, $M^2$ is In, $n_1$ is 2, $n_2$ is 3, A+2B+3C=X, A/X is 0.40, 2B/X is 0.40 and 3C/X is 0.20, was prepared.

Using the zeolite, a catalyst was prepared in the same manner as in the Example 1.

Denitrization

A gas composed of 200 ppm of NO, 2% of $O_2$, 10% of $H_2O$ and the balance $N_2$ was passed through the catalysts in a space velocity of 1000 $hr^{-1}$ at 300° C., 400° C. and 500° C., respectively. The conversion rates of NO to $N_2$ are shown in the Table 2.

TABLE 2

| | Type of Starting Zeolite | Catalyst | | |
|---|---|---|---|---|
| | | $M^1$ | $M^2$ | A/X | $n_1$B/X |
| Example | | | | | |
| 1 | X | Ca | Cu | 0.40 | 0.40 |
| 2 | X | Ca | Cu | 0.10 | 0.70 |
| 3 | X | Ca | Cu | 0.70 | 0.10 |
| 4 | X | Ca | Cu | 0.40 | 0.50 |
| 5 | X | Ca | Ru | 0.40 | 0.40 |
| 6 | X | Ca | Rh | 0.40 | 0.70 |
| 7 | X | Ca | Pd | 0.40 | 0.40 |
| 8 | X | Ca | Ag | 0.45 | 0.45 |
| 9 | X | Ca | Pt | 0.40 | 0.40 |
| 10 | X | Ca | Au | 0.40 | 0.40 |
| 11 | X | Ca | Co | 0.40 | 0.40 |
| 12 | X | Ca | Cr | 0.40 | 0.40 |
| 13 | X | Ca | Ni | 0.40 | 0.40 |
| 14 | A | Ca | Cu | 0.40 | 0.40 |
| 15 | X | Na | Cu | 0.40 | 0.40 |
| 16 | A | Na | Cu | 0.40 | 0.40 |
| 17 | M*) | Na | Cu | 0.40 | 0.40 |
| 18 | A | K | Cu | 0.40 | 0.40 |
| 19 | A | Mg | Cu | 0.40 | 0.40 |
| 20 | X | Sr | Cu | 0.40 | 0.40 |
| 21 | X | Ba | Cu | 0.40 | 0.40 |
| 22 | A | Na | Cu | 0.30 | 0.33 |
| Compara. | | | | | |
| 1 | X | Zn | Cu | 0.40 | 0.40 |
| 2 | X | Ca | Cu | 0.40 | 0.40 |
| 3 | X | Ca | In | 0.40 | 0.40 |

| | Catalyst | Denitrizing Rate (%) Reaction Temperature (°C.) | | |
|---|---|---|---|---|
| | $n_2$C/X | 300 | 400 | 500 |
| Example | | | | |
| 1 | 0.20 | 83.6 | 96.7 | 98.9 |
| 2 | 0.20 | 76.5 | 82.2 | 90.5 |
| 3 | 0.10 | 69.3 | 81.1 | 91.6 |
| 4 | 0.20 | 59.1 | 72.3 | 88.1 |
| 5 | 0.20 | 61.1 | 76.5 | 82.2 |
| 6 | 0.20 | 53.3 | 79.2 | 84.6 |
| 7 | 0.20 | 40.5 | 66.6 | 79.3 |
| 8 | 0.10 | 52.2 | 81.4 | 88.1 |
| 9 | 0.20 | 86.5 | 96.1 | 98.7 |
| 10 | 0.20 | 88.6 | 97.1 | 99.2 |
| 11 | 0.20 | 72.1 | 88.6 | 81.8 |
| 12 | 0.20 | 61.1 | 80.2 | 85.6 |
| 13 | 0.20 | 49.8 | 71.1 | 76.3 |
| 14 | 0.20 | 86.6 | 95.3 | 98.8 |
| 15 | 0.20 | 62.8 | 79.1 | 86.6 |
| 16 | 0.20 | 59.9 | 77.1 | 82.2 |
| 17 | 0.20 | 63.6 | 78.2 | 86.6 |

TABLE 2-continued

| | | | | |
|---|---|---|---|---|
| 18 | 0.20 | 48.7 | 69.3 | 80.2 |
| 19 | 0.20 | 82.6 | 91.1 | 96.1 |
| 20 | 0.20 | 76.2 | 88.8 | 95.5 |
| 21 | 0.20 | 75.6 | 86.3 | 97.0 |
| 22 | 0.47 | 63.3 | 76.2 | 89.9 |
| Compara. | | | | |
| 1 | 0.20 | 32.1 | 43.3 | 48.7 |
| 2 | 0.20 | 36.5 | 43.1 | 49.9 |
| 3 | 0.20 | 38.1 | 46.2 | 51.6 |

Notes: *)Mordenite

What is claimed is:

1. A denitrizing catalyst which comprises a zeolite represented by the general formula $$H_A(M^1)_B(M^2)_C[(AlO_2)_X \cdot (SiO_2)_Y] \cdot zH_2O$$

wherein $M^1$ is an alkali metal or an alkaline earth metal, $M^2$ is a metal selected from the group consisting of Ru, Rh, Pd, Ag, Pt, Au, Co, Cu, Cr and Ni, and $A + n_1B + n_2C = X$ wherein $n_1$ and $n_2$ are valences of the metals $M^1$ and $M^2$, respectively.

2. The catalyst as claimed in claim 1 wherein $A/X > 0.1$, $n_1B/X > 0.1$ and $n_2C/X > 0.05$.

* * * * *